(12) United States Patent
Veeraragavan et al.

(10) Patent No.: US 9,984,330 B2
(45) Date of Patent: May 29, 2018

(54) PREDICTIVE TRENDING OF DIGITAL ENTITIES

(71) Applicant: Microsoft Technology Licensing, LLC, Redmond, WA (US)

(72) Inventors: Narasimha Raghavan Veeraragavan, Oslo (NO); Bjorn Olstad, Oslo (NO); Helge Grenager Solheim, Olso (NO)

(73) Assignee: MICROSOFT TECHNOLOGY LICENSING, LLC., Redmond, WA (US)

( * ) Notice: Subject to any disclaimer, the term of this patent is extended or adjusted under 35 U.S.C. 154(b) by 443 days.

(21) Appl. No.: 14/683,499

(22) Filed: Apr. 10, 2015

(65) Prior Publication Data
US 2016/0300141 A1     Oct. 13, 2016

(51) Int. Cl.
*G06N 5/04*      (2006.01)
*G06Q 30/02*     (2012.01)
*G06N 99/00*     (2010.01)
*H04L 29/08*     (2006.01)

(52) U.S. Cl.
CPC ............. *G06N 5/04* (2013.01); *G06N 99/005* (2013.01); *G06Q 30/02* (2013.01); *H04L 67/22* (2013.01)

(58) Field of Classification Search
None
See application file for complete search history.

(56) References Cited

U.S. PATENT DOCUMENTS

| 7,672,937 | B2 | 3/2010 | Madhavan et al. |
| 7,725,346 | B2 | 5/2010 | Gruhl et al. |
| 8,166,026 | B1 | 4/2012 | Sadler |
| 8,468,083 | B1 | 6/2013 | Szulczewski |
| 8,554,709 | B2 | 10/2013 | Goodson et al. |
| 8,613,024 | B2 | 12/2013 | Bovenschulte et al. |
| 8,615,442 | B1 * | 12/2013 | Kapur ................ G06Q 30/0269 705/26.1 |

(Continued)

FOREIGN PATENT DOCUMENTS

EP      2407897 A1      1/2012

OTHER PUBLICATIONS

Shepard, Cyrus, "The Moz Blog", Published on: Dec. 12, 2011, Available at: http://moz.com/blog/google-fresh-factor.

(Continued)

*Primary Examiner* — Alan S Chen
(74) *Attorney, Agent, or Firm* — Merchant & Gould (57) ABSTRACT

Surfacing relevant and predictively trending digital entities to a user in a content feed is provided. Aspects of a predictive trending system use one or more predictive models, such as neural networks or regression models, to generate predictive trending scores of digital entities (e.g., documents, people, electronic communications, meetings, locations, digital images, digital videos, digital audio, etc.) based on historical scores and context. By taking into account trends and context, the predictive trending system calculates future trending scores of digital entities, and determines which digital entities are both relevant to a given user and likely to be trending around the user and the people in the user's network in the future. The predictive trending system curates the digital entities determined to be relevant and predicted to be trending around the user, and presents the digital entities in a content feed.

20 Claims, 8 Drawing Sheets

(56) References Cited

U.S. PATENT DOCUMENTS

| | | |
|---|---|---|
| 8,782,046 B2 | 7/2014 | Avner et al. |
| 2007/0094254 A1 | 4/2007 | Cutts et al. |
| 2010/0114954 A1 | 5/2010 | Sareen et al. |
| 2010/0280985 A1 | 11/2010 | Duchon et al. |
| 2011/0302103 A1 | 12/2011 | Carmel et al. |
| 2013/0085803 A1 | 4/2013 | Mauro et al. |
| 2013/0117349 A1 | 5/2013 | Burnette et al. |
| 2013/0159233 A1 | 6/2013 | Mason et al. |
| 2013/0159506 A1 | 6/2013 | Stern et al. |
| 2014/0019443 A1* | 1/2014 | Golshan ............ G06F 17/30867 707/723 |
| 2014/0114941 A1 | 4/2014 | Ahlberg et al. |
| 2015/0032740 A1 | 1/2015 | Rao et al. |
| 2015/0046436 A1* | 2/2015 | Li ....................... G06F 17/3053 707/723 |
| 2015/0169583 A1* | 6/2015 | O'Neil .............. G06F 17/30619 707/748 |

OTHER PUBLICATIONS

PCT Second Written Opinion Issued in PCT Application No. PCT/US2016/026600, dated Feb. 24, 2017, 6 Pages.

PCT International Search Report & Written Opinion Received for PCT Application No. PCT/US2016/026600, dated Jul. 5, 2016, 12 Pages.

"International Preliminary Report on Patentability Issued in PCT Application No. PCT/US2016/026600", dated May 29, 2017, 7 Pages.

* cited by examiner

PREDICTIVE TRENDING OF DIGITAL ENTITIES

BACKGROUND

Information workers/users have become accustomed to generating, editing, viewing, and receiving large numbers of electronic documents and other information (e.g., electronic communications, images, data, etc.). In an enterprise situation, for example, a company, school, social network, etc., a given user may encounter hundreds (or more) of documents or other information items, each with varying degrees of relevance, interest, or importance to the information worker, and that are oftentimes scattered across a variety of workloads and storage systems (e.g., email, social feeds, intranet sites, network file systems, etc.). Accordingly, it can be time consuming and inefficient for users to search for content that is relevant to them. Additionally, users are most likely unaware of people and information items that are likely to be popular around them according to trends, for example, people who a user's colleague are likely to collaborate with, documents that a user's colleagues are likely to interact with, emails that a user's colleagues are likely to receive, meetings that a user's colleagues are likely to attend, etc.

SUMMARY

This summary is provided to introduce a selection of concepts in a simplified form that are further described below in the Detailed Description section. This summary is not intended to identify key features or essential features of the claimed subject matter, nor is it intended as an aid in determining the scope of the claimed subject matter.

Aspects are directed to an automated system and method for surfacing relevant and predictively trending digital entities to a user in a content feed. Examples of the predictive trending system use one or more predictive models, such as neural networks or regression models, to generate predictive trending scores of digital entities (e.g., documents, people, electronic communications, meetings, locations, digital images, digital videos, digital audio, etc.) based on historical scores and context. By taking into account trends and context, the predictive trending system calculates future trending scores of digital entities, and determines which digital entities are both relevant to a given user and likely to be trending around the user and the people in the user's network in the future. The predictive trending system collects the digital entities determined to be relevant and predicted to be trending around the user, and presents the digital entities in a content feed. Accordingly, aspects of the predictive trending system increase user efficiency by enabling users to spend less time searching for content that they need. Additionally, users are able to skip steps that they would normally have to go through to find content for which they are searching, and thus, aspects of the present disclosure reduce network bandwidth.

According to an aspect, examples are implemented as a computer process, a computing system, or as an article of manufacture such as a computer program product or computer readable media. According to an aspect, the computer program product is a computer storage media readable by a computer system and encoding a computer program of instructions for executing a computer process.

The details of one or more aspects are set forth in the accompanying drawings and description below. Other features and advantages will be apparent from a reading of the following detailed description and a review of the associated drawings. It is to be understood that the following detailed description is explanatory only and is not restrictive.

BRIEF DESCRIPTION OF THE DRAWINGS

The accompanying drawings, which are incorporated in and constitute a part of this disclosure, illustrate various examples. In the drawings.

DETAILED DESCRIPTION

The following detailed description refers to the accompanying drawings. Wherever possible, the same reference numbers are used in the drawings and the following description to refer to the same or similar elements. While examples are described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description is not limiting, but instead, the proper scope is described by the appended claims. Examples may take the form of a hardware implementation, or an entirely software implementation, or an implementation combining software and hardware aspects. The following detailed description is, therefore, not to be taken in a limiting sense.

Figure 1:
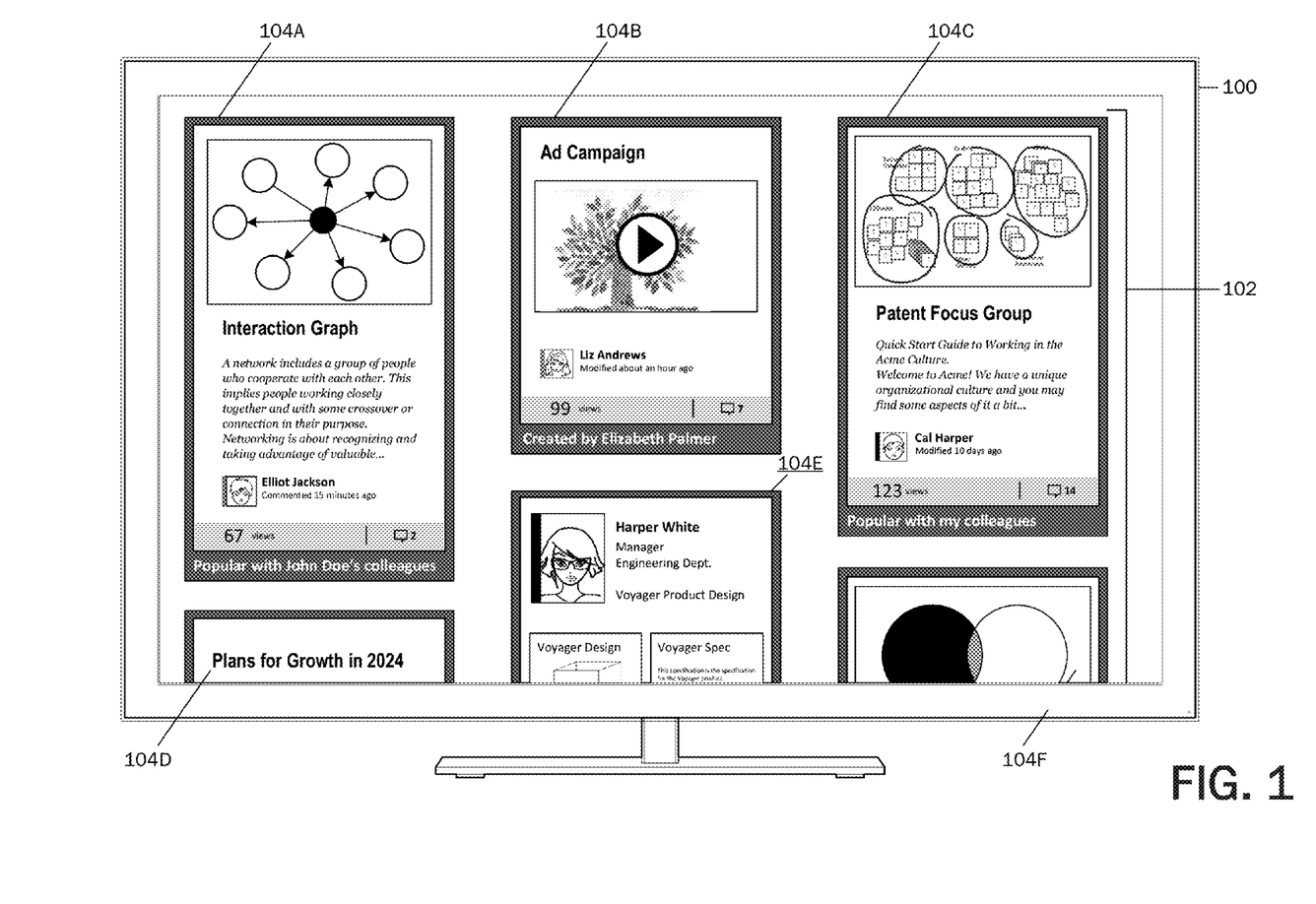
FIG. 1 is an illustration of an example content feed of digital entities surfaced to a user.

Aspects are directed to surfacing relevant and predictively trending digital entities to a user in a content feed by using one or more predictive models, such as neural networks or regression models, to generate predictive trending scores of the digital entities based on historical scores and context. FIG. 1 is an illustration of an example content feed 102 of digital entities 104A-F (collectively, 104) surfaced to a user. As illustrated in FIG. 1, a number of digital entities 104, for example, documents, content items, people, emails or other electronic communications, email attachments, meetings, locations, digital images, digital videos, digital audio files, or other information items, are displayed in a content feed 102 on a display surface of a computing device 100. The computing device 100 illustrated in FIG. 1 is a desktop-style computing device, but as should be appreciated, the content feed 102 is displayable on a display surface of any suitable computing device such as a desktop computer, laptop computer, tablet-style computer, handheld computing device, mobile communication device, and the like.

The digital entities 104 illustrated in the content feed 102 are graphical representations of content or people determined to be interesting or relevant to the user. According to an aspect, digital entities 104 are displayed in a content feed 102 as content cards, which comprise one or more of: a header, a title, a preview image of the digital entity 104, information to help the user to understand why the digital entity 104 would be interesting or relevant to the user, and a selectable link to access the digital entity 104 or to navigate to a page associated with the digital entity. For example, selection of a link associated with a video allows the user to view the video digital entity. As another example, selection of a link associated with a person allows the user to navigate to a page associated with the person, wherein the page may comprise such information as some of the people that the person works with and a selection of digital entities 104 that are popular among the person's colleagues.

According to an aspect, the content feed 102 includes one or more digital entities 104 that may not yet be trending among colleagues of the user, but that are predicted to be trending among colleagues of the user in the future as determined by a predictive trending engine. According to examples, the predictive trending engine comprises a predictive model, such as neural network, time series, or regression model, and is operable to determine predictive scores and predictive thresholds for digital entities 104 based on historical scores and the context of the historical scores. Predictive modeling techniques learn patterns hidden in large volumes of historical data. Once learning is completed and a model is validated, it is enabled to generalize the knowledge it learned from the historical data and to apply the generalized knowledge to a new situation to predict the future, for example, if a digital entity 104 will be popular around a user. As is known in the art, a learning system based on a neural network structure is a recognized approach for predictive analytics, where an artificial neural network is an electronic model based on the neural structure of the brain that learns the relationship between inputs and output through training and/or adaptation. As is also known in the art, regression models are a standard approach to modeling a relationship between one outcome variable and several input variables, where the focus lies on establishing a mathematical equation as a model to represent the interactions between the different variables in consideration. A times series model can predict trends based on an original dataset used to create the model. The predictive trending engine and the predictive model, which uses one or a combination of neural network, regression, and time series machine learning techniques, will be described in further detail below.

According to an aspect, the content feed 102 is provided by a software application containing sufficient computer executable instructions for generating the content feed 102 and for displaying the digital entities 104 making up the content feed 102, as illustrated in FIG. 1. The content feed 102 is accessible from a variety of different access points. According to an aspect, the content feed application operates as a stand-alone application. According to another aspect, the content feed application operates as a module of any of a variety of other applications, for example, emailing applications, word processing applications, spreadsheet applications, slide presentation applications, notes taking applications, desktop publishing applications, and the like for allowing a user to access and display the content feed 102, as desired.

Figure 2:
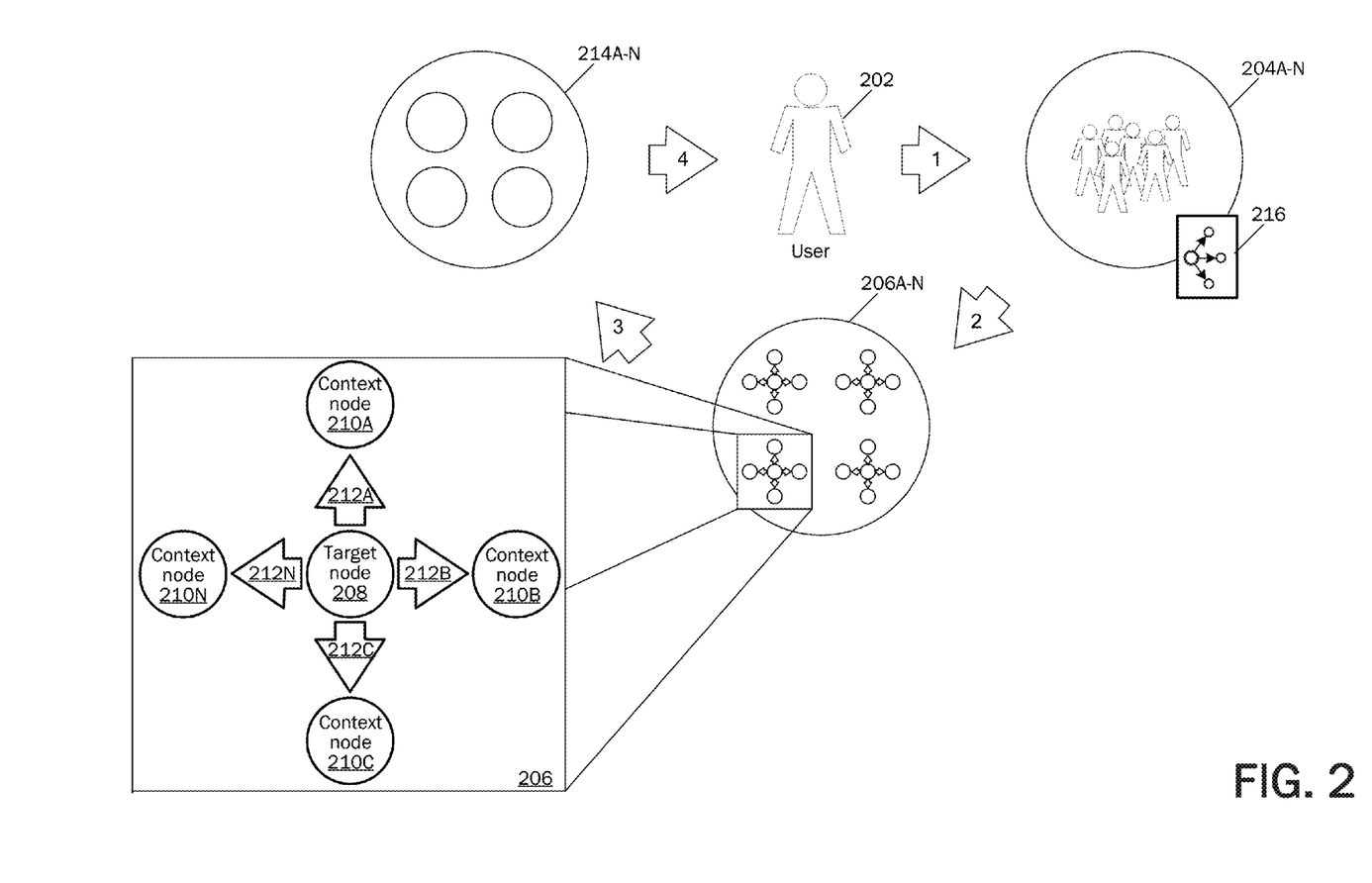
FIG. 2 is a simplified block diagram illustrating a general flow for surfacing relevant and predictively trending digital entities to a user in a content feed by using a predictive model.

FIG. 2 is a simplified block diagram illustrating a general flow for surfacing relevant and predictively trending digital entities to a user in a content feed by using a predictive model. For a given user 202, the digital entities 104 that are likely to be the most relevant and interesting to the user 202 include a mix of content worked on or likely to be worked on by the user 202 and content that is active or likely to be active among people with whom the user works. This group of people is referred to herein as the user's colleagues 204A-N, wherein colleagues include the people with whom the user 202 interacts regularly and the people who share an organizational relationship with the user 202 (e.g., organizational colleague, manager, directs, etc.). As will be described in greater detail below, a user's relationships, activities with people and content, and scores associated with the relationships and activities are stored in a graph 216.

Aspects of a predictive trending system collect scores for digital entities 104 at various time periods for each user 202 in an enterprise and the contexts for the scores from the graph 216, and use the collected scores and contexts to build a plurality of digital entity-specific predictive graph data models 206A-N (collectively, 206). Examples of score calculations are described in detail below. According to examples, activities associated with a document are stored in a document-specific predictive graph data model, and meeting activities are stored in a meetings-specific predictive graph data model, etc. The collected data is built into and stored in the plurality of digital entity-specific predictive graph data models 206 for training and validating the predictive model and to predict future trending scores of digital entities 104 according to the context. The context is used to calculate relative performance. For example, by using context to calculate relative performance, the best postings from less popular blogs may score higher than mediocre postings from very popular blogs. According to an aspect, previous scores are aged out in an intelligent manner. For example, older scores are stored with less density (e.g., activity per week instead of per hour, day, etc.).

Referring still to FIG. 2, an example predictive graph data model 206 for a digital entity 104 is illustrated. The example predictive graph data model 206 includes two types of nodes: a target node 208, which represents the digital entity 104 of interest, and one or more context nodes 210A-N (collectively, 210), which represent the contexts in which the digital entity 104 is measured. For example, the target node 208 may represent a document, a first context node 210A may represent an enterprise blog (e.g., a SharePoint® blog) in which the document is posted, and a second context node 210B may represent a personal blog in which the document is posted.

As illustrated, an edge 212A-N (collectively, 212) exists between the target node 208 and each of the one or more context nodes 210. The one or more edges 212 represent how the activities associated with the digital entity 104 are perceived in the particular context by the user 202. An edge schema for each edge 212 comprises the scores and the relevant properties that are used to generate the scores. For example, an edge schema may include properties such as: a number of likes, a number of shares, a number of comments, a number of views, the score, a current trending threshold value, and a timestamp. According to an aspect, the values of the properties in the edge schema are used for training and validation of the predictive model. For example, by analyzing historical data as a training set in combination with the actual future score for a target node 208, the best edge weights can be identified and reused for future predictions. The values of the properties in the edge schema are additionally used as inputs to produce values to properties of predictive trending facets of the target node 208. The output of the predictive model is a facet schema of the target node 208 comprising a list of predictive properties (e.g., scores, threshold values, and statuses) as determined by the predictive model.

According to an aspect, for a given graphic entity 104, the predictive model normalizes the edge schema properties according to the context prior to determining and setting predictive threshold values. For example, a first document may be posted in an enterprise blog (large audience), and a second document may be posted in a personal blog (smaller audience). As can be appreciated, it is likely that the first document would receive a higher number of likes, views, and shares in comparison with the second document. If the predictive model did not normalize the edge schema properties according to context prior to setting the predictive threshold values, the first document would likely be selected as a predictive trending document even though the second document has received a high number of likes, shares, and views within the context of being posted in a personal blog with a smaller audience.

For each digital entity 104, the predictive model calculates a predictive score for each context based on the historical scores stored in the edge schemas. The predictive threshold values for each context are determined by the predictive model, and are used for comparison against the calculated predictive scores. For a given digital entity 104, if the predictive score in the facet schema is greater than or equal to the predictive threshold, then the target node 208 is determined to be a predictive trending digital entity 214. Predictive trending digital entities 214A-N (collectively, 214) are presented to the user 202 in the user's content feed 102.

Figure 3:
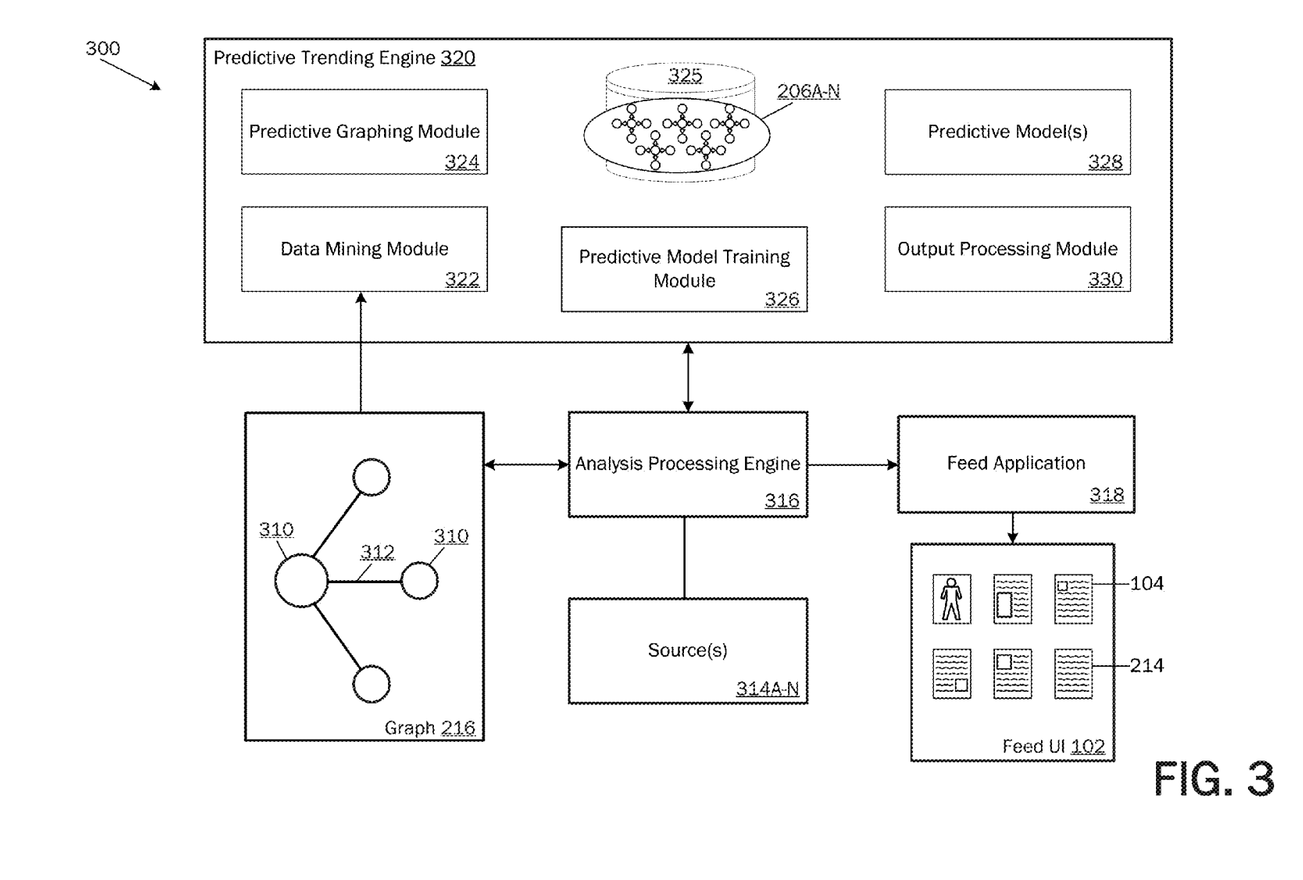
FIG. 3 is a simplified block diagram of a system for surfacing relevant and predictively trending digital entities to a user in a content feed.

FIG. 3 illustrates a system 300 for surfacing relevant and predictively trending digital entities 104 to a user in a content feed 102. As illustrated in FIG. 3, using a graph 216, an analysis processing engine 316 in communication with one or more ranking modules analyzes a variety of data and actions from the various sources 314A-N (collectively, 314), for their interest or relevance to a given user 202 and for potential surfacing to the user 202 in the content feed 102. For example, the various sources 314 may include remote servers, local or remote databases, local or remote shared resources repositories, social networking service servers, and the like. The sources 314 store documents, images, data files, video files, audio files, locations, meeting items, communication items, such as electronic mail items, text messages, telephone messages, posts, blogs, and the like.

According to an aspect, the graph 216 includes information about enterprise digital entities 104, such as people and documents and the relationships and interactions among the digital entities 104. The digital entities 104 are represented as nodes 310, and the relationship and interactions are represented as edges 312. Edges 312 represent a single interaction (e.g., a colleague modified a document, the user viewed an image, etc.), are representative of multiple interactions (e.g., people with whom the user frequently interacts, items that are popular in the user's circle of colleagues, etc.), or represent an organizational relationship (e.g., manager, colleague, etc.).

Aspects of a predictive trending system include a predictive trending engine 320 comprising one or more predictive models 328, and is operable to predict future scores for digital entities 104 based on historical scores and the contexts of the historical scores. That is, the predictive trending engine 320 evaluates values of properties associated with digital entities 104 against historical data to determine which digital entities 104 are likely to be popular around a given user 202 in the future. At a first time period, the predictive trending engine 320 is operable to predict that one or more historical variables (i.e., properties in the edge schema) associated with a digital entity 104 will reach a threshold value at a second time period. Accordingly, the digital entity 104 is presented to the user 202 in a content feed 102 before the digital entity 104 reaches the threshold value that would make the digital entity 104 a candidate for inclusion in the content feed 102.

The predictive trending engine 320 comprises a data mining module 322 for collecting data from the graph 216 for each user in an enterprise, a predictive graphing module 324 for building the plurality of digital entity-specific predictive graph data models 206, a storage device 325 for storing the plurality of digital entity-specific predictive graph data models 206, and a predictive model training module 326 for training and verifying the predictive model 328 based on values of properties associated with the plurality of stored digital entity-specific predictive graph data models 206.

According to an aspect, the predictive trending engine 320 is in communication with an analysis processing engine 316 for determining an importance, interest, or relevance of each digital entity 104 to a given user 202 for possible inclusion in the user's individualized content feed 102. Each content feed 102 is analyzed with respect to each individual user 202 so that the digital entities 104 surfaced to the user in the user's personalized content feed 102 are those items that are determined to be interesting, important, or relevant to the individual user.

When analyzing a digital entity 104 for scoring, various attributes of the digital entity 104, such as the activity performed on the digital entity 104 (e.g., view, modify, like, etc.) and relationships between people associated with the digital entity 104, are used for calculating a particular score for the digital entity 104.

As a first example, a factor used for scoring a digital entity 104 includes whether the digital entity 104 is generated by or acted on by the user 202 for which the content feed 102 is being created. As a next example, the type of action performed by the user is utilized as a factor. As another example, a factor used for scoring a digital entity 104 includes whether the digital entity 104 has been acted on by a colleague 204 of the user 202. As another example, the type of action performed by the colleague 204 is used as a factor. As another example, a rank or seniority of the colleague 204 who has acted on the digital entity 104 is used as a factor. For example, scoring may be different depending on whether a colleague 204 is the user's manager, direct report, someone who the user manages, etc., according to any particular enterprise structure.

According to an aspect, other factors are used for calculating a score (e.g., time decay, type of content, user's preferences, etc.). Other examples of scoring factors include: a frequency of viewings of the digital entity 104 by one or more people; whether the digital entity 104 has been sent to the user 202 for which the feed is being generated and, if so, by whom; an analysis of topics included in a given digital entity 104 (e.g., text strings from a digital entity 104 may be extracted and compared against text strings contained in other digital entities 104 already contained in the user's content feed 102 or contained in or associated with other digital entities 104 that have been previously ranked or scored sufficiently for inclusion in the content feed 102); and social interaction with the digital entity 104 (e.g., information showing that a given digital entity 104 has been commented on, liked, viewed, or otherwise utilized in a social network may be utilized in determining a scoring or ranking for a given digital entity 104). Scores are used for determining which digital entities to include in a given instance of the content feed 102.

According to an aspect, one or more back-end or client side ranking modules are operable to monitor activities in a given enterprise at frequent, regular intervals including a monitoring of various digital entities 104 generated, received by, or sent from the enterprise for determining a set of digital entities 104 that should be added to the content feed 102 of a given user 202 when the user next accesses the content feed 102. As should be appreciated, the process of retrieving information and digital entities 104 from various information sources 314, analysis of the information, and representation of relationships between people and digital entities 104 in the graph 216 as edges 312 and nodes 310 is an iterative process that is updated as new information sources become available.

As described above with respect to FIG. 2, the data collected by the data mining module 322 includes each user's activities (including the score and the context for each score) around digital entities 104 at various time periods. The collected data is built into the plurality of digital entity-specific predictive graph data models 206 by the predictive graphing module 324, and stored in the storage device 325 for retrieval by the predictive model training module 326 for training and validating the predictive model 328, and by the predictive model 328 for predicting future trending scores (i.e., predictive scores) of digital entities 104 according to the context and for comparing the predictive scores against a predictive threshold value for the context.

For each digital entity 104, the predictive model 328 is operable to take the scores for each context from each predictive graph data model 206 edge schema as input, and normalize the scores (e.g., based on the number of views, shares, etc.) according to the context. According to an example, a normalized score for a digital entity 214 is equal to the number of views of the digital entity 214 in a particular context divided by the historical maximum number of views in the particular context. The predictive model 328 is further operable to determine current and predictive threshold values for the given digital entity 104 against which generated predictive scores are compared. According to an aspect, the current threshold value is set by the analysis processing engine 316 and is used to determine which digital entities 214 to include in a content feed 102 based on current (actual) scores/values. According to another aspect, the predictive threshold value is a score that is either based on historical values or calculated according to an increase of activity during a delta time. The predictive threshold value is a lower score than the current threshold value, and is predicted to reach the current threshold value at a later time. According to an aspect, the predictive threshold value can be trained using a training set of historical and present values.

For a given digital entity 104, if the generated predictive score is greater than or equal to the determined predictive threshold, the digital entity 104 is determined to be a predictive trending digital entity 214. That is, at a first time period ($T_0$), the predictive model 328 is able to predict whether a digital entity 104 will be trending around a given user 202 at a second time period ($T_1$), wherein a determination of whether the digital entity 104 will be trending is based at least in part on whether the predicted score at $T_1$ is greater than or equal to the predictive threshold value at $T_0$.

The output of the predictive model 328 is a facet schema of the target node 208 representative of the digital entity 104 of interest, and is indicative of a determination made by the predictive model 328 as to the likelihood that the digital entity 104 of interest is likely to be popular or trending around the user 202 in the future. The facet schema of the target node 208 includes predictive trending scores and thresholds for each context associated with the target node 208, and a status set as true or false according to the comparison of the predictive score against the predictive threshold (i.e., whether the predictive score is greater than or equal to the predictive threshold). An output processing module 330 receives output from the predictive model 328, and exposes the predictive trending digital entities 214 to the analysis processing engine 316 for inclusion in the user's content feed 102.

Referring still to FIG. 3, the feed application 318 is an application operable for extracting the digital entities 104 from the graph 216 for generating the content feed 102 and for displaying the digital entities 104 of the present instance of the content feed 102 in a user interface, as illustrated above with reference to FIG. 1. According to an aspect, the feed application 318 operates as a stand-alone application for creating and displaying a given content feed 102. Alternatively, according to another aspect, functionality for accessing the feed application 318 is operated as a software module of other applications, for example, emailing applications, word processing applications, spreadsheet applications, slide presentation applications, and the like such that a user 202 is enabled to access and display his/her content feed 102 from any of these types of software applications.

Having described an operating environment and various aspects of aspects with respect to FIGS. 1-3, FIG. 4 is a flow chart illustrating a method for surfacing relevant and predictive trending digital entities 214 to a user 202 in a content feed 102 by using the predictive model 328 to generate predictive trending scores of the digital entities based on historical scores and context. The routine 400 begins at start OPERATION 405 and proceeds to OPERATION 410, where users' explicit actions are tracked, for example, peoples' pages that users visit, digital entities 104 that users view, modify, follow, etc., people with whom users communicate, etc. As described above, the actions are stored in the graph 216 in the form of edges 212 where the edges 212 are representative of relationship types based on activity At OPERATION 415, the analysis processing engine 316 analyzes signals between digital entities 104, and calculates scores for each digital entity 104 based on various factors, such as the activity performed, frequency of the activity, recentness of the activity, an organizational structure, etc. The scores are stored in the graph 216.

Figure 4:
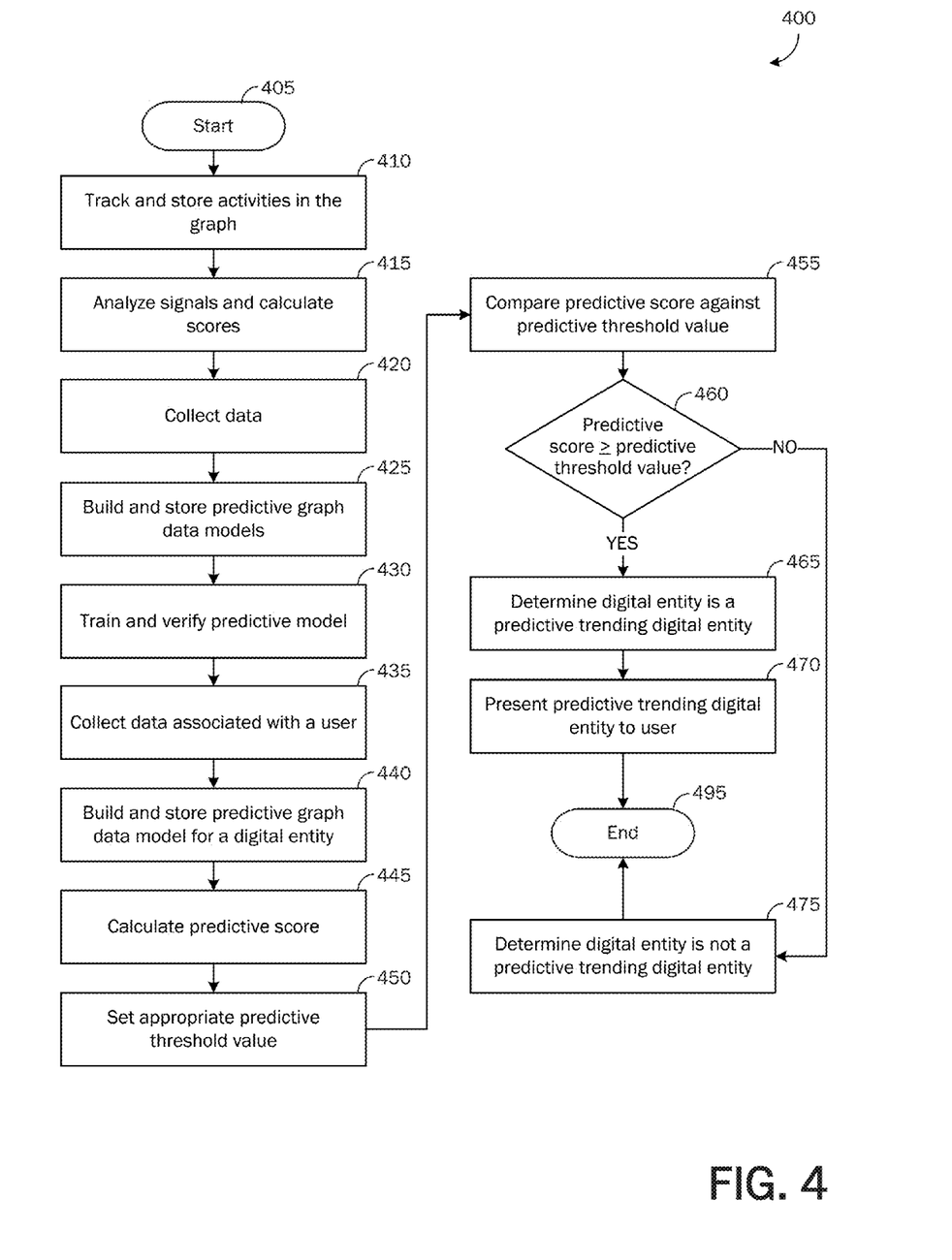
FIG. 4 illustrates an operational flow surfacing relevant and predictively trending digital entities to a user in a content feed.

At OPERATION 420, the data mining module 322 collects data from the graph 216 for each user in an enterprise, and passes the data to the predictive graphing module 324. At OPERATION 425, the predictive graphing module 324 builds digital entity-specific predictive graph data models 206 from the collected data, where the digital entity 104 of interest is represented as the target node 208, the one or more contexts in which the digital entity 104 is measured is represented as one or more context nodes 210, and the properties of the activities associated with the digital entity 104 in a particular context are stored as an edge 212. The scores and the relevant properties that are used to generate the scores (e.g., a number of likes, a number of shares, a number of comments, a number of views, a current trending threshold value, and a timestamp) are stored in the associated edge schema. The predictive graph data models 206 are stored in the storage device 325.

At OPERATION 430, the predictive model 328 is trained using the stored predictive graph data models 206. According to an aspect, the predictive model 328 is trained by using one or a combination of various machine learning techniques, for example, regression analyses, neural networks, and time series. After the training process, the predictive model 328 is verified by applying a predictive graph data model 206 to the predictive model 328. The output of the verification process is analyzed to determine if the predictive model 328 is successful in predicting the trending of the digital entity 104 associated with the predictive graph data model 206.

At OPERATION 435, the data mining module 322 collects data from the graph 216 for a particular user 202 in the enterprise, and passes the data to the predictive graphing module 324. The data for the particular user 202 collected by the data mining module 322 includes digital entities 104 that have been acted on by the user 202 and/or colleagues 204 of the user 202, but that are not currently trending around the user 202 or the user's colleagues 204. For example, this may include a document created by a colleague 204 and shared with another colleague 204 of the user 202, an email received by the user 202, an upcoming meeting on the user's calendar, a location searched for by the user 202 or a colleague of the user 202, etc.

At OPERATION 440, the predictive graphing module 324 builds digital entity-specific predictive graph data models 206 for each of the graphic entities 104 from the collected data, where the target node 208 of each predictive graphic module 324 represents each graphic entity 104, the one or more context nodes 210 represent the contexts of the activity on the graphic entity 104, and the one or more edges 212 represent the action(s) performed in each context. For example, for a particular user 202, the predictive graphing module 324 constructs a predictive graph data model 206 with a document as the target node 208. Assume that the document has been posted on a colleague's personal blog (first context), has been viewed by four other colleagues 204 of the user 202 (# of views property value in the edge schema for the first context=4), and has been shared with two other colleagues 204 (# of shares property value in the edge schema for the first context=2). An example of the edge schema for the document is below:

TABLE 1

Example Edge Schema

| PROPERTY NAME | DATA TYPE | PROPERTY VALUE |
| --- | --- | --- |
| # of Likes | Int64 | 0 |
| # of Shares | Int64 | 2 |
| # of Comments | Int64 | 0 |
| # of Views | Int64 | 4 |
| # of Tags | Int64 | 0 |
| Score | Double | 6 |
| Current trending around threshold | Double | 16 |
| Current trending timestamp | DateTime | Mon, 14 May 2020 16:39:00-0700 (PDT) |

The predictive graphing module 324 stores the digital entity-specific predictive graph data models 206 for each graphic entity 104 in the storage device 325. At OPERATION 445, the predictive model 328 takes the values of the properties in the edge schema as inputs, evaluates the data, normalizes the values according to the context, and generates a predictive score for the digital entity 104 of interest. According to an aspect, the predictive model 328 is operable to normalize the values according to the user's interest as determined by historical data or user preferences.

At OPERATION 450, the predictive model 328 sets an appropriate predictive threshold value for each context associated with the graphic entity 104 of interest based on the historical data, and at OPERATION 455, the predictive model 328 compares the generated predictive score against the set predictive threshold value. At DECISION OPERATION 460, a determination is made as to whether the predictive score is greater than or equal to the predictive threshold. If the predictive score is greater than or equal to the predictive threshold, the method 400 proceeds to OPERATION 465, where the digital entity 104 of interest is determined to be a predictive trending digital entity 214. That is, the determination made by the predictive model 328 is indicative as to the likelihood that the digital entity 104 of interest is likely to be popular or trending around the user 202 in the future.

At OPERATION 470, the output processing module 330 receives output from the predictive model 328, and exposes the predictive trending digital entity 214 to the analysis processing engine 316 for inclusion in the user's content feed 102. According to an aspect, the feed application 318 generates a content card for each predictive trending digital entity 214 selected to be posted in the user's content feed 102.

If at DECISION OPERATION 460, a determination is made that the predictive score is not greater than or equal to the predictive threshold, the method 400 proceeds to OPERATION 475, where the digital entity 104 of interest is determined not to be a predictive trending digital entity 214. Accordingly, the digital entity 104 will not be presented to the user 202 in the user's content feed 102. The method 400 ends at OPERATION 495.

Aspects of the predictive trending system provide for surfacing relevant and predictively trending digital entities 214 to a user 202 in a content feed 102 by storing historical activity data and contexts associated with a plurality of digital entities 104 at various time periods in a storage device 325; using the historical activity data to train and verify a predictive model 328; collecting activity data including contexts associated with a digital entity 104 of interest; building a predictive graph data model 206 comprising one or more edge schemas for the digital entity 104 of interest, the one or more edge schemas comprising properties and property values associated with the activity data and the contexts; inputting the one or more edge schemas into the predictive model 328; normalizing the property values according to the contexts based on the historical activity data; setting a predictive threshold value based on the historical activity data; calculating a predictive score for the digital entity; comparing the predictive score against the predictive threshold value; upon determining that the predictive score is greater than or equal to the predictive threshold value, determining the digital entity 104 of interest is likely to be trending around the user 202 at a future time; and presenting the digital entity to the user 202 in a content feed 102.

While examples have been described in the general context of program modules that execute in conjunction with an application program that runs on an operating system on a computer, those skilled in the art will recognize that examples may also be implemented in combination with other program modules. Generally, program modules include routines, programs, components, data structures, and other types of structures that perform particular tasks or implement particular abstract data types.

The aspects and functionalities described herein may operate via a multitude of computing systems including, without limitation, desktop computer systems, wired and wireless computing systems, mobile computing systems (e.g., mobile telephones, netbooks, tablet or slate type computers, notebook computers, and laptop computers), handheld devices, multiprocessor systems, microprocessor-based or programmable consumer electronics, minicomputers, and mainframe computers.

In addition, according to an aspect, the aspects and functionalities described herein operate over distributed systems (e.g., cloud-based computing systems), where application functionality, memory, data storage and retrieval and various processing functions are operated remotely from each other over a distributed computing network, such as the Internet or an intranet. According to an aspect, user interfaces and information of various types are displayed via on-board computing device displays or via remote display units associated with one or more computing devices. For example, user interfaces and information of various types are displayed and interacted with on a wall surface onto which user interfaces and information of various types are projected. Interaction with the multitude of computing systems with which examples are practiced include, keystroke entry, touch screen entry, voice or other audio entry, gesture entry where an associated computing device is equipped with detection (e.g., camera) functionality for capturing and interpreting user gestures for controlling the functionality of the computing device, and the like.

Figure 5:
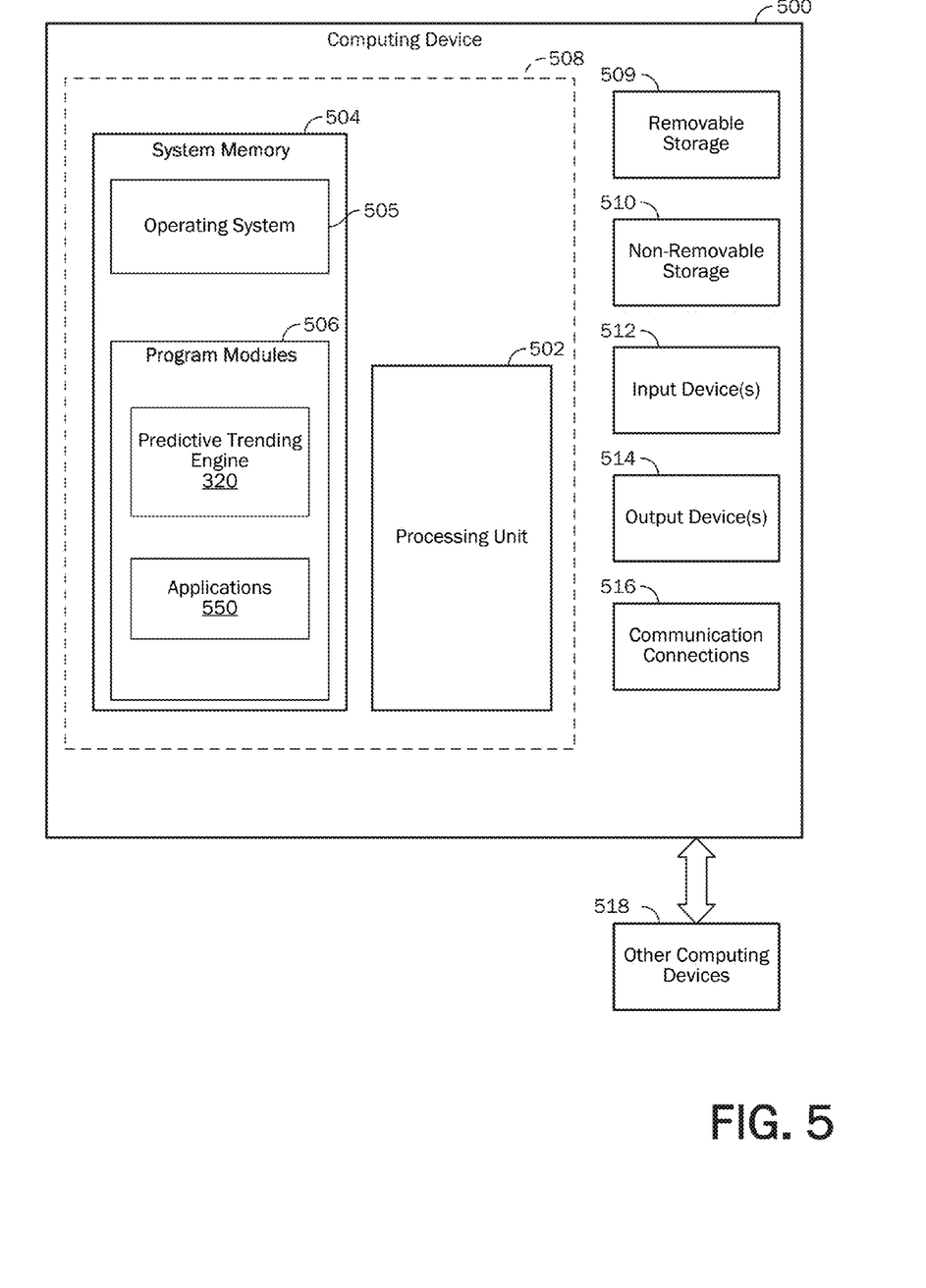
FIG. 5 is a block diagram illustrating example physical components of a computing device with which examples may be practiced.
Figure 6A:
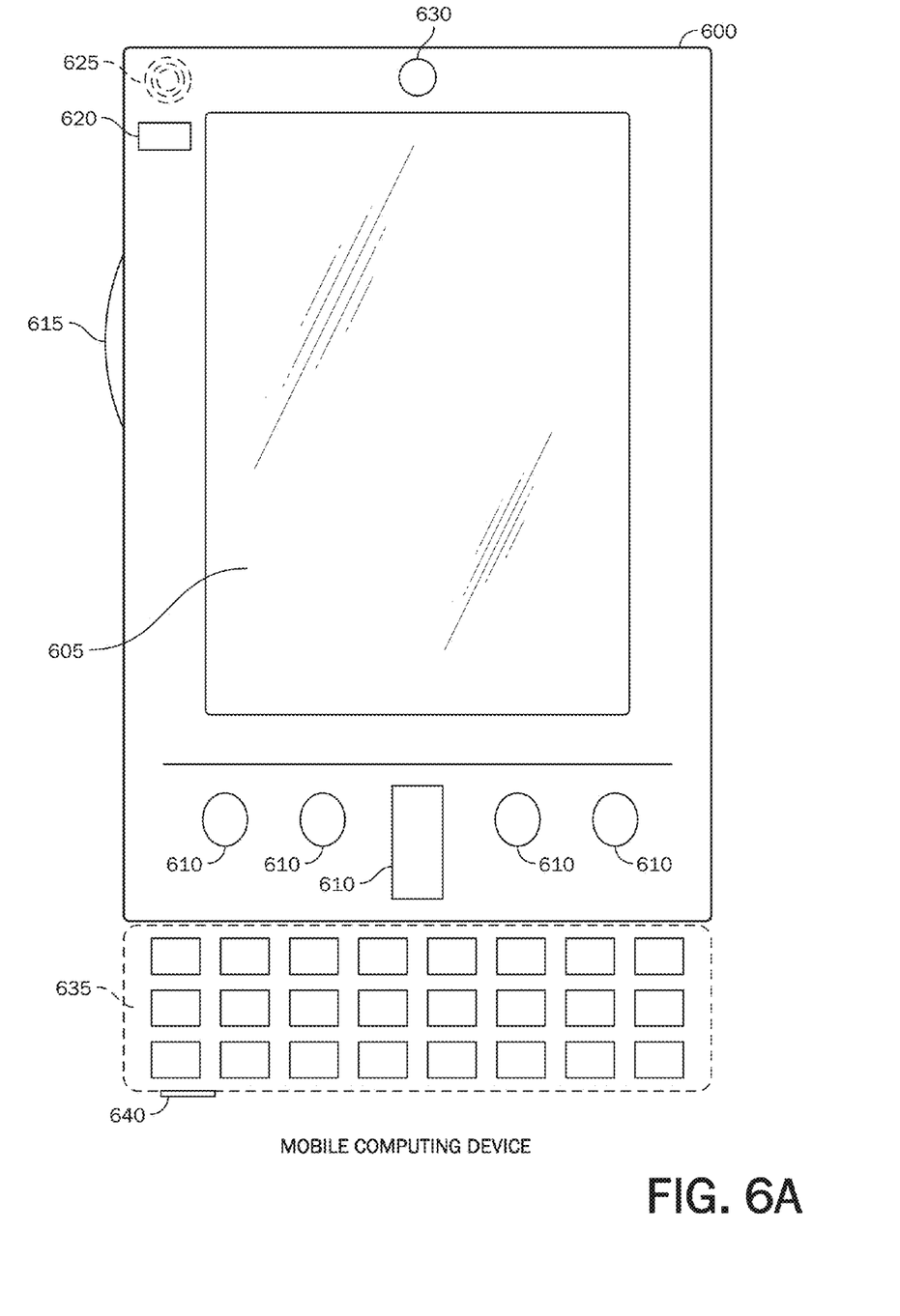
FIGS. 6A and 6B are simplified block diagrams of a mobile computing device with which examples may be practiced.
Figure 6B:
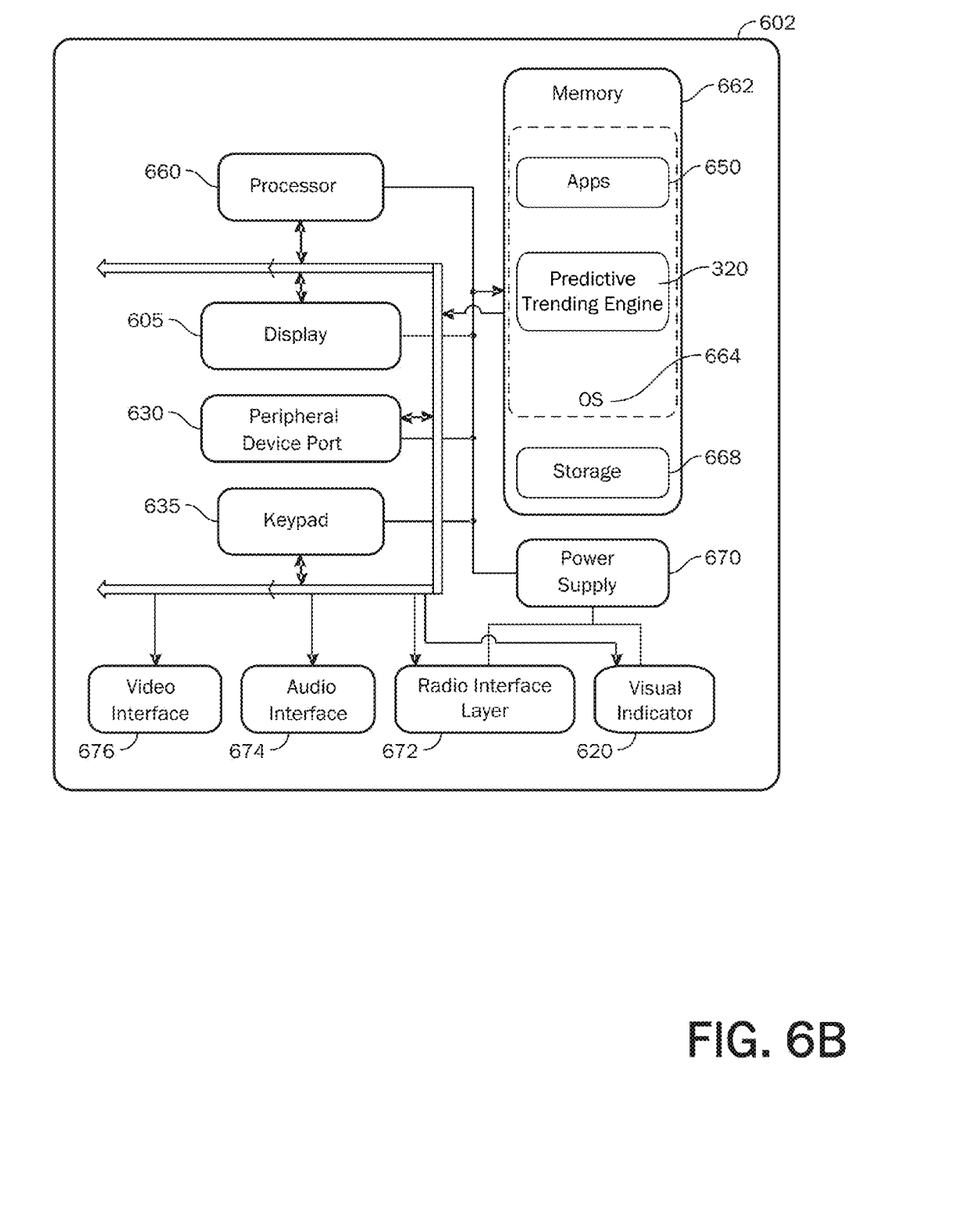
Figure 7:
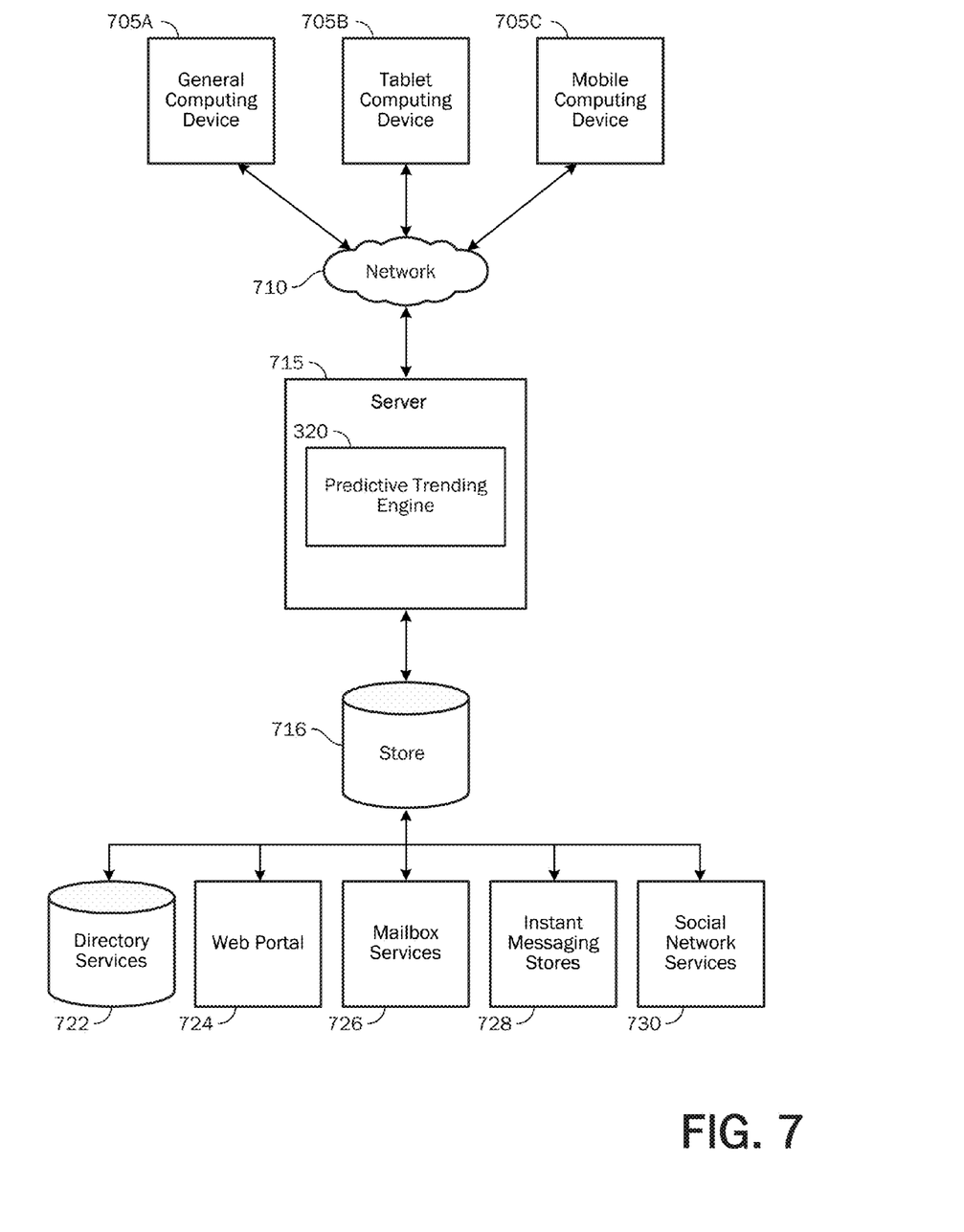
FIG. 7 is a simplified block diagram of a distributed computing system in which examples may be practiced.

FIG. 5-7 and the associated descriptions provide a discussion of a variety of operating environments in which examples are practiced. However, the devices and systems illustrated and discussed with respect to FIGS. 5-7 are for purposes of example and illustration and are not limiting of a vast number of computing device configurations that are utilized for practicing examples, described herein.

FIG. 5 is a block diagram illustrating physical components (i.e., hardware) of a computing device 500 with which examples of the present disclosure are be practiced. In a basic configuration, the computing device 500 includes at least one processing unit 502 and a system memory 504. According to an aspect, depending on the configuration and type of computing device, the system memory 504 comprises, but is not limited to, volatile storage (e.g., random access memory), non-volatile storage (e.g., read-only memory), flash memory, or any combination of such memories. According to an aspect, the system memory 504 includes an operating system 505 and one or more programming modules 506 suitable for running software applications 550. According to an aspect, the system memory 504 includes the predictive trending engine 320. The operating system 505, for example, is suitable for controlling the operation of the computing device 500. Furthermore, examples are practiced in conjunction with a graphics library, other operating systems, or any other application program, and is not limited to any particular application or system. This basic configuration is illustrated in FIG. 5 by those components within a dashed line 508. According to an aspect, the computing device 500 has additional features or functionality. For example, according to an aspect, the computing device 500 includes additional data storage devices (removable and/or non-removable) such as, for example, magnetic disks, optical disks, or tape. Such additional storage is illustrated in FIG. 5 by a removable storage device 509 and a non-removable storage device 510.

As stated above, according to an aspect, a number of program modules and data files are stored in the system memory 504. While executing on the processing unit 502, the program modules 506 (e.g., predictive trending engine 320) perform processes including, but not limited to, one or more of the stages of the method 400 illustrated in FIG. 4. According to an aspect, other program modules are used in accordance with examples and include applications such as electronic mail and contacts applications, word processing applications, spreadsheet applications, database applications, slide presentation applications, drawing or computer-aided application programs, etc.

According to an aspect, examples are practiced in an electrical circuit comprising discrete electronic elements, packaged or integrated electronic chips containing logic gates, a circuit utilizing a microprocessor, or on a single chip containing electronic elements or microprocessors. For example, aspects are practiced via a system-on-a-chip (SOC) where each or many of the components illustrated in FIG. 5 are integrated onto a single integrated circuit. According to an example, such an SOC device includes one or more processing units, graphics units, communications units, system virtualization units and various application functionality all of which are integrated (or "burned") onto the chip substrate as a single integrated circuit. When operating via an SOC, the functionality, described herein, is operated via application-specific logic integrated with other components of the computing device 500 on the single integrated circuit (chip). According to an aspect, aspects of the present disclosure are practiced using other technologies capable of performing logical operations such as, for example, AND, OR, and NOT, including but not limited to mechanical, optical, fluidic, and quantum technologies. In addition, examples are practiced within a general purpose computer or in any other circuits or systems.

According to an aspect, the computing device 500 has one or more input device(s) 512 such as a keyboard, a mouse, a pen, a sound input device, a touch input device, etc. The output device(s) 514 such as a display, speakers, a printer, etc. are also included according to an aspect. The aforementioned devices are examples and others may be used. According to an aspect, the computing device 500 includes one or more communication connections 516 allowing communications with other computing devices 518. Examples of suitable communication connections 516 include, but are not limited to, RF transmitter, receiver, and/or transceiver circuitry; universal serial bus (USB), parallel, and/or serial ports.

The term computer readable media as used herein include computer storage media. Computer storage media include volatile and nonvolatile, removable and non-removable media implemented in any method or technology for storage of information, such as computer readable instructions, data structures, or program modules. The system memory 504, the removable storage device 509, and the non-removable storage device 510 are all computer storage media examples (i.e., memory storage.) According to an aspect, computer storage media includes RAM, ROM, electrically erasable programmable read-only memory (EEPROM), flash memory or other memory technology, CD-ROM, digital versatile disks (DVD) or other optical storage, magnetic cassettes, magnetic tape, magnetic disk storage or other magnetic storage devices, or any other article of manufacture which can be used to store information and which can be accessed by the computing device 500. According to an aspect, any such computer storage media is part of the computing device 500. Computer storage media does not include a carrier wave or other propagated data signal.

According to an aspect, communication media is embodied by computer readable instructions, data structures, program modules, or other data in a modulated data signal, such as a carrier wave or other transport mechanism, and includes any information delivery media. According to an aspect, the term "modulated data signal" describes a signal that has one or more characteristics set or changed in such a manner as to encode information in the signal. By way of example, and not limitation, communication media includes wired media such as a wired network or direct-wired connection, and wireless media such as acoustic, radio frequency (RF), infrared, and other wireless media.

FIGS. 6A and 6B illustrate a mobile computing device 600, for example, a mobile telephone, a smart phone, a tablet personal computer, a laptop computer, and the like, with which examples may be practiced. With reference to FIG. 6A, an example of a mobile computing device 600 for implementing the aspects is illustrated. In a basic configuration, the mobile computing device 600 is a handheld computer having both input elements and output elements. The mobile computing device 600 typically includes a display 605 and one or more input buttons 610 that allow the user to enter information into the mobile computing device 600. According to an aspect, the display 605 of the mobile computing device 600 functions as an input device (e.g., a touch screen display). If included, an optional side input element 615 allows further user input. According to an aspect, the side input element 615 is a rotary switch, a button, or any other type of manual input element. In alternative examples, mobile computing device 600 incorporates more or less input elements. For example, the display 605 may not be a touch screen in some examples. In alternative examples, the mobile computing device 600 is a portable phone system, such as a cellular phone. According to an aspect, the mobile computing device 600 includes an optional keypad 635. According to an aspect, the optional keypad 635 is a physical keypad. According to another aspect, the optional keypad 635 is a "soft" keypad generated on the touch screen display. In various aspects, the output elements include the display 605 for showing a graphical user interface (GUI), a visual indicator 620 (e.g., a light emitting diode), and/or an audio transducer 625 (e.g., a speaker). In some examples, the mobile computing device 600 incorporates a vibration transducer for providing the user with tactile feedback. In yet another example, the mobile computing device 600 incorporates input and/or output ports, such as an audio input (e.g., a microphone jack), an audio output (e.g., a headphone jack), and a video output (e.g., a HDMI port) for sending signals to or receiving signals from an external device. In yet another example, the mobile computing device 600 incorporates peripheral device port 640, such as an audio input (e.g., a microphone jack), an audio output (e.g., a headphone jack), and a video output (e.g., a HDMI port) for sending signals to or receiving signals from an external device.

FIG. 6B is a block diagram illustrating the architecture of one example of a mobile computing device. That is, the mobile computing device 600 incorporates a system (i.e., an architecture) 602 to implement some examples. In one example, the system 602 is implemented as a "smart phone" capable of running one or more applications (e.g., browser, e-mail, calendaring, contact managers, messaging clients, games, and media clients/players). In some examples, the system 602 is integrated as a computing device, such as an integrated personal digital assistant (PDA) and wireless phone.

According to an aspect, one or more application programs 650 are loaded into the memory 662 and run on or in association with the operating system 664. Examples of the application programs include phone dialer programs, e-mail programs, personal information management (PIM) programs, word processing programs, spreadsheet programs, Internet browser programs, messaging programs, and so forth. According to an aspect, the predictive trending engine 320 is loaded into memory 662. The system 602 also includes a non-volatile storage area 668 within the memory 662. The non-volatile storage area 668 is used to store persistent information that should not be lost if the system 602 is powered down. The application programs 650 may use and store information in the non-volatile storage area 668, such as e-mail or other messages used by an e-mail application, and the like. A synchronization application (not shown) also resides on the system 602 and is programmed to interact with a corresponding synchronization application resident on a host computer to keep the information stored in the non-volatile storage area 668 synchronized with corresponding information stored at the host computer. As should be appreciated, other applications may be loaded into the memory 662 and run on the mobile computing device 600.

According to an aspect, the system 602 has a power supply 670, which is implemented as one or more batteries. According to an aspect, the power supply 670 further includes an external power source, such as an AC adapter or a powered docking cradle that supplements or recharges the batteries.

According to an aspect, the system 602 includes a radio 672 that performs the function of transmitting and receiving radio frequency communications. The radio 672 facilitates wireless connectivity between the system 602 and the "outside world," via a communications carrier or service provider. Transmissions to and from the radio 672 are conducted under control of the operating system 664. In other words, communications received by the radio 672 may be disseminated to the application programs 650 via the operating system 664, and vice versa.

According to an aspect, the visual indicator 620 is used to provide visual notifications and/or an audio interface 674 is used for producing audible notifications via the audio transducer 625. In the illustrated example, the visual indicator 620 is a light emitting diode (LED) and the audio transducer 625 is a speaker. These devices may be directly coupled to the power supply 670 so that when activated, they remain on for a duration dictated by the notification mechanism even though the processor 660 and other components might shut down for conserving battery power. The LED may be programmed to remain on indefinitely until the user takes action to indicate the powered-on status of the device. The audio interface 674 is used to provide audible signals to and receive audible signals from the user. For example, in addition to being coupled to the audio transducer 625, the audio interface 674 may also be coupled to a microphone to receive audible input, such as to facilitate a telephone conversation. According to an aspect, the system 602 further includes a video interface 676 that enables an operation of an on-board camera 630 to record still images, video stream, and the like.

According to an aspect, a mobile computing device 600 implementing the system 602 has additional features or functionality. For example, the mobile computing device 600 includes additional data storage devices (removable and/or non-removable) such as, magnetic disks, optical disks, or tape. Such additional storage is illustrated in FIG. 6B by the non-volatile storage area 668.

According to an aspect, data/information generated or captured by the mobile computing device 600 and stored via the system 602 is stored locally on the mobile computing device 600, as described above. According to another aspect, the data is stored on any number of storage media that is accessible by the device via the radio 672 or via a wired connection between the mobile computing device 600 and a separate computing device associated with the mobile computing device 600, for example, a server computer in a distributed computing network, such as the Internet. As should be appreciated such data/information is accessible via the mobile computing device 600 via the radio 672 or via a distributed computing network. Similarly, according to an aspect, such data/information is readily transferred between computing devices for storage and use according to well-known data/information transfer and storage means, including electronic mail and collaborative data/information sharing systems.

FIG. 7 illustrates one example of the architecture of a system for surfacing relevant and predictive trending digital entities 214 to a user 202 in a content feed 102 as described above. Content developed, interacted with, or edited in association with the predictive trending engine 320 is enabled to be stored in different communication channels or other storage types. For example, various documents may be stored using a directory service 722, a web portal 724, a mailbox service 726, an instant messaging store 728, or a social networking site 730. The predictive trending engine 320 is operable to use any of these types of systems or the like for surfacing relevant and predictive trending digital entities 214 to a user 202 in a content feed 102, as described herein. According to an aspect, a server 715 provides the predictive trending engine 320 to clients 705A,B,C. As one example, the server 715 is a web server providing the predictive trending engine 320 over the web. The server 715 provides the predictive trending engine 320 over the web to clients 705 through a network 710. By way of example, the client computing device is implemented and embodied in a personal computer 705A, a tablet computing device 705B or a mobile computing device 705C (e.g., a smart phone), or other computing device. Any of these examples of the client computing device are operable to obtain content from the store 716.

Examples are described above with reference to block diagrams and/or operational illustrations of methods, systems, and computer program products. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

The description and illustration of one or more examples provided in this application are not intended to limit or restrict the scope as claimed in any way. The aspects, examples, and details provided in this application are considered sufficient to convey possession and enable others to make and use the best mode. The claims should not be construed as being limited to any aspect, example, or detail provided in this application. Regardless of whether shown and described in combination or separately, the various features (both structural and methodological) are intended to be selectively included or omitted to produce an example with a particular set of features. Having been provided with the description and illustration of the present application, one skilled in the art may envision variations, modifications, and alternate examples falling within the spirit of the broader aspects of the general inventive concept embodied in this application that do not depart from the broader scope of the claims.

We claim:

1. A computer-implemented method for surfacing relevant and predictively trending digital entities to a user in a content feed, comprising:
   collecting activity data including contexts associated with a digital entity of interest;
   collecting and storing historical activity data and contexts associated with a plurality of digital entities at various time periods;
   using the historical activity data to train and verify a predictive model;
   using the predictive model:
      calculating a predictive score for the digital entity of interest, comprising:
         building a predictive graph data model comprising one or more edge schemas for the digital entity of interest, the one or more edge schemas comprising properties and property values associated with the activity data and contexts;
         inputting the one or more edge schemas into the predictive model;
         setting a predictive threshold value based on the historical activity data; and
         generating the predictive score for the digital entity of interest based on the historical activity data;
      comparing the predictive score against a predictive threshold value; and
      upon determining that the predictive score is greater than or equal to the predictive threshold value, determining the digital entity of interest is likely to be trending around the user at a future time; and
   generating a content feed comprising the digital entity of interest.

2. The computer-implemented method of claim 1, wherein building the predictive graph data model for the digital entity of interest comprises representing the digital entity of interest as a target node, representing an activity associated with the digital entity of interest in a particular context as an edge, and representing the context as a context node.

3. The computer-implemented method of claim 1, wherein properties associated with the activity data and the contexts in the edge schema comprise:
   a number of likes;
   a number of shares;
   a number of comments;
   a number of views;
   a number of tags;
   a score;
   a current trending threshold value; and
   a timestamp.

4. The computer-implemented method of claim 1, wherein prior to setting the predictive threshold value, normalizing the property values according to the contexts based on the historical activity data.

5. The computer-implemented method of claim 1, wherein collecting the activity data including the contexts associated with the digital entity of interest comprises collecting the activity data and the context data associated with the digital entity of interest from a graph.

6. The computer-implemented method of claim 1, wherein the predictive graph data model is an entity-specific predictive graph data model that is based on activities associated with one specific type of digital entity.

7. A system for surfacing digital entities to a user in a content feed, comprising:
one or more processors for executing programmed instructions;
memory, coupled to the one or more processors, for storing program instruction steps for execution by the computer processor;
a data mining module for receiving activity data and contexts associated a digital entity of interest;
a predictive model component for:
calculating a predictive score for the digital entity of interest;
comparing the predictive score against a predictive threshold value; and
upon determining that the predictive score is greater than or equal to the predictive threshold value, determining the digital entity of interest is likely to be trending around the user at a future time;
a feed application for generating a content feed comprising the digital entities of interest that are determined to be likely trending around the user at a future time;
an output processing module for:
receiving output from the predictive model; and
exposing the digital entity of interest that is determined to be likely trending around the user at a future time to the feed application;
a predictive graphing module for building a plurality of predictive graph data models comprising historical activity data and contexts associated with a plurality of digital entities at various time periods and a predictive graph data model comprising activity data and contexts associated with the digital entity of interest, wherein the predictive graphing module is operable to:
represent the digital entity of interest as a target node;
represent activities associated with the digital entity of interest in particular contexts as one or more edges; and
represent the contexts as one or more context nodes;
a storage device module for storing the plurality of predictive graph data models comprising historical activity data and contexts associated with the plurality of digital entities at various time periods and the predictive graph data model comprising activity data and contexts associated with the digital entity of interest; and
a predictive model training module for training and validating the predictive model component based on the plurality of predictive graph data models comprising historical activity data and contexts associated with the plurality of digital entities at various time periods, thereby providing a trained and validated predictive model component.

8. The system of claim 7, further comprising a data mining module for collecting the historical activity data and contexts associated with the plurality of digital entities at various time periods and the activity data and contexts associated with the digital entity of interest from a graph.

9. The system of claim 7, wherein each of the one or more edges comprise an associated edge schema, the edge schema comprising properties associated with the activity data and the contexts.

10. The system of claim 9, wherein in determining whether the digital entity of interest is likely to be trending around the user at a future time, the predictive model is operable to:
receive the edge schema;
set a predictive threshold value based on the historical activity data;
calculate a predictive score for the digital entity of interest;
compare the predictive score against the predictive threshold value;
determine whether the predictive score is greater than or equal to the predictive threshold value; and
upon determining that the predictive score is greater than or equal to the predictive threshold value, determine the digital entity of interest is likely to be trending around the user at a future time.

11. The system of claim 10, wherein prior to setting the predictive threshold value, the predictive model is further operable to normalize the property values according to the contexts based on the historical activity data.

12. The system of claim 10, wherein the property values comprise:
a number of likes;
a number of shares;
a number of comments;
a number of views;
a number of tags;
a score;
a current trending threshold value; and
a timestamp.

13. The system of claim 7, wherein the digital entity of interest comprises one or more of:
a document;
a person;
an electronic communication;
a meeting;
a location;
a digital image;
a digital video file; and
a digital audio file.

14. The system of claim 7, wherein the predictive model is one or a combination of:
a neural network;
a linear or non-linear regression model; and
a time series model.

15. The system of claim 7, wherein the predictive graph data model is an entity-specific predictive graph data model that is based on activities associated with one specific type of digital entity.

16. One or more computer storage media storing computer-usable instructions that, when used by one or more computing devices, cause the one or more computing devices to perform a method for surfacing relevant and predictively trending digital entities to a user in a content feed, the method comprising:
storing historical activity data and contexts associated with a plurality of digital entities at various time periods in a storage device;
using the historical activity data to train and verify a predictive model;
collecting activity data including contexts associated with a digital entity of interest;
building a predictive graph data model comprising one or more edge schemas for the digital entity of interest, the one or more edge schemas comprising properties and property values associated with the activity data and the contexts;
inputting the one or more edge schemas into the predictive model;

normalizing the property values according to the contexts based on the historical activity data
setting a predictive threshold value based on the historical activity data;
calculating a predictive score for the digital entity of interest;
comparing the predictive score against the predictive threshold value;
upon determining that the predictive score is greater than or equal to the predictive threshold value, determining the digital entity of interest is likely to be trending around the user at a future time; and
presenting the digital entity of interest to the user in a content feed as a predictive trending digital entity.

17. The one or more computer storage media of claim 16, wherein building a predictive graph data model for the digital entity of interest comprises representing the digital entity of interest as a target node, representing an activity associated with the digital entity of interest in a particular context as an edge, and representing the context as a context node.

18. The one or more computer storage media of claim 16, wherein the one or more digital entities of interest comprises one or more of:

a document;
a person;
an electronic communication;
a meeting;
a location;
a digital image;
a digital video file; and
a digital audio file.

19. The one or more computer storage media of claim 16, wherein the properties associated with the activity data and the contexts in the edge schema comprise:

a number of likes;
a number of shares;
a number of comments;
a number of views;
a number of tags;
a score;
a current trending threshold value; and
a timestamp.

20. The one or more computer storage media of claim 16, wherein the predictive graph data model is an entity-specific predictive graph data model that is based on activities associated with one specific type of digital entity.

* * * * *